(12) United States Patent
Hu et al.

(10) Patent No.: US 12,143,320 B2
(45) Date of Patent: Nov. 12, 2024

(54) CLIENT DEVICE AND SERVING DEVICE FOR ASSOCIATING PTRS ANTENNA PORTS TO DMRS ANTENNA PORTS

(71) Applicant: Huawei Technologies Co., Ltd., Shenzhen (CN)

(72) Inventors: Wenquan Hu, Shenzhen (CN); Min Zhang, Shenzhen (CN); Bengt Lindoff, Lund (SE); Thorsten Schier, Lund (SE); Han Zhou, Shanghai (CN); Xiaoyan Bi, Ottawa (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 324 days.

(21) Appl. No.: 17/669,801

(22) Filed: Feb. 11, 2022

(65) Prior Publication Data
US 2022/0166570 A1    May 26, 2022

Related U.S. Application Data

(63) Continuation of application No. PCT/EP2019/071843, filed on Aug. 14, 2019.

(51) Int. Cl.
*H04L 5/00* (2006.01)
*H04J 13/00* (2011.01)
*H04W 72/20* (2023.01)

(52) U.S. Cl.
CPC ........ *H04L 5/0026* (2013.01); *H04J 13/0003* (2013.01); *H04L 5/0048* (2013.01); *H04L 5/0092* (2013.01); *H04W 72/20* (2023.01)

(58) Field of Classification Search
CPC ... H04L 5/0026; H04L 5/0048; H04L 5/0092; H04L 5/0032; H04L 5/0044; H04L 1/06;
(Continued)

(56) References Cited

U.S. PATENT DOCUMENTS 10,447,319 B1    10/2019 Lee et al.
10,951,290 B2 *   3/2021 Zhang ................. H04B 7/0632
(Continued)

FOREIGN PATENT DOCUMENTS

WO    2018171800 A1    9/2018
WO    2018182242 A2    10/2018
WO    2019095701 A1    5/2019

OTHER PUBLICATIONS

"Enhancements on Multi-TRP and Multi-Panel Transmission," Source: OPPO, Agenda Item: 7.2.8.2, Document for: Discussion and Decision, 3GPP TSG RAN WG1 Meeting #96bis, R1-1904036, Xi'an, China, Apr. 8-12, 2019, 10 pages.
(Continued)

*Primary Examiner* — Rasheed Gidado
(74) *Attorney, Agent, or Firm* — SLATER MATSIL, LLP

(57) ABSTRACT

A client device for associating phase tracking reference signal (PTRS) antenna ports to demodulation reference signal (DMRS) antenna ports, the client device being configured obtain configuration information related to a set of PTRS antenna ports, obtain control information indicating at least one of one or more codewords, a set of DMRS antenna ports assigned to the one or more codewords, or transmission configuration indication (TCI) information indicating one or more TCI states, and determine an association between the set of PTRS antenna ports and the set of DMRS antenna ports based on the configuration information related to the set of PTRS antenna ports and the control information.

25 Claims, 4 Drawing Sheets

(58) Field of Classification Search
CPC ............... H04W 72/1278; H04W 72/20; H04J 13/0003
See application file for complete search history.

(56) References Cited

U.S. PATENT DOCUMENTS

| | | | | |
|---|---|---|---|---|
| 11,206,118 | B2* | 12/2021 | Hunukumbure | H04L 5/0051 |
| 2019/0140729 | A1* | 5/2019 | Zhang | H04W 52/16 |
| 2020/0213050 | A1* | 7/2020 | Chen | H04L 5/005 |
| 2020/0235979 | A1* | 7/2020 | Yokomakura | H04W 88/02 |
| 2021/0168011 | A1* | 6/2021 | Davydov | H04L 5/0048 |
| 2022/0006581 | A1* | 1/2022 | Yamada | H04W 72/1273 |

OTHER PUBLICATIONS

"3rd Generation Partnership Project; Technical Specification Group Radio Access Network; NR; Physical layer procedures for data (Release 15)," 3GPP TS 38.214 V15.6.0, Jun. 2019, 105 pages.

"Discussion on RS for Phase Tracking," Source: ZTE, Agenda Item: 7.1.2.4.3, Document for: Discussion and Decision, 3GPP TSG RAN WG1 Meeting #89, R1-1707132, May 14-19, 2017, 12 pages.

"Discussion on Explicit and Implicit Signaling for PT-RS," Agenda Item: 7.1.2.4.3, Source: National Instruments, Document for: Discussion and Decision, 3GPP TSG AN WG1 Meeting #89, R1-1708272, May 15-19, 2017, 12 pages.

"Discussion on PT-RS," Source: vivo, Agenda Item: 6.1.2.3.4, Document for: Discussion and Decision, 3GPP TSG RAN WG1 Meeting #90, R1-1712843, Aug. 21-25, 2017, 4 pages.

"Discussion on PT-RS Design," Source: CMCC, Agenda Item: 6.1.2.3.4, Document for: Discussion and Decision, 3GPP TSG RAN WG1 Meeting #90, R1-1713841, Aug. 21-25, 2017, 8 pages.

"Remaining Details on Dl Dmrs and Ul Dmrs," Source: ZTE, Sanechips, Agenda Item: 6.2.3.3, Document for: Discussion and Decision, 3GPP TSG RAN WG1 Meeting NR#3, R1-1715449, Sep. 18-21, 2017, 10 pages.

"Remaining Issues on PTRS," Agenda Item: 6.2.3.4, Source: Lenovo, Motorola Mobility, Dcoument for: Discussion, 3GPP TSG RAN WG1 Meeting NR#3, R1-1715538, Sep. 18-21, 2017, 4 pages.

"Discussion on PT-RS Design," Source: CMCC, Agenda Item: 6.2.3.4, Document for: Discussion and Decision, 3GPP TSG RAN WG1 Meeting NR#3, R1-1716052, Sep. 18-21, 2017, 8 pages.

"Remaining Issues on PT-RS," Source: CATT, Agenda Item: 7.2.3.4, Document for: Discussion and Decision, 3GPP TSG RAN WG1 Meeting AH 1801, R1-1800246, Vancouver, Canada, Jan. 22-26, 2018, 5 pages.

"Remaining Issues on PT-RS," Source: CATT, Agenda Item: 7.1.2.3.4, Document for: Discussion and Decision, 3GPP TSG RAN WG1 Meeting #92bis, R1-1803748, Apr. 16-20, 2018, 8 pages.

"CR to 38.214: Maintenance According to Agreed Rel 15 Features," Source to WG: Nokia Source to TSG: Work Item Code: NR_newRAT-Core, Date: May 11, 2018, Category: F, Release: Rel-15, 3GPP TSG-RAN1 Meeting #93, R1-1807968, Busan, Korea, May 21-25, 2018, 10 pages.

"Enhancements on Multi-TRP/Panel Transmission," Source: ZTE, Agenda Item: 7.2.8.2, Document for: Discussion and Decision, 3GPP TSG RAN WG1 #96, R1-1901634, Feb. 25-Mar. 1, 2019, 20 pages.

"Updated Work Plan of RAN 1 and 4 NR," Agenda item: A.I, Source: NTT Docomo & Drafting Group, Document for: Discussion and Decision, 3GPP TSG-RAN #77, RP-172108, Sapporo, Japan, Sep. 11-14, 2017, 4 pages.

* cited by examiner

```
                  DMRSs of single CW
                 ╱                   ╲
Two TCI states ╱── DMRSs of two CWs ──╲ Two PTRSs
```

CLIENT DEVICE AND SERVING DEVICE FOR ASSOCIATING PTRS ANTENNA PORTS TO DMRS ANTENNA PORTS

CROSS-REFERENCE TO RELATED APPLICATIONS

This application is a continuation of International Application No. PCT/EP2019/071843, filed on Aug. 14, 2019, the disclosure of which is hereby incorporated by reference in its entirety.

TECHNICAL FIELD

The invention relates to a client device and a network access node for associating phase tracking reference signals (PTRS) antenna ports to demodulation reference signal (DMRS) antenna ports. Furthermore, the invention also relates to corresponding methods and a computer program.

BACKGROUND

In 3rd generation partnership project (3GPP) new radio (NR) phase tracking reference signals (PTRS) are used for phase tracking at the receiver. PTRS is needed to achieve the highest possible throughput, i.e. when a user equipment (UE) have high signal-to-interference and noise ratio (SINR), in case of phase noise impairments in front-end radios and also in scenarios with high Doppler shift. In these situations, the phase needs to be tracked for optimized performance.

In NR Rel. 15, only one PTRS antenna port is supported in the downlink (DL) and the PTRS antenna port is associated with one demodulation reference signal (DMRS) antenna port assigned for a codeword. The downlink DMRS antenna port(s) associated with a PTRS antenna port are assumed to be quasi co-located (QCL) with respect to the parameters: {delay spread, Doppler spread, Doppler shift, average delay, spatial receiving parameters}.

In NR, if a UE is scheduled with one codeword, the PTRS antenna port is associated with the lowest indexed DMRS antenna port among the DMRS antenna ports assigned for a physical downlink shared channel (PDSCH). If a UE is scheduled with two codewords, the PTRS antenna port is associated with the lowest indexed DMRS antenna port among the DMRS antenna ports assigned for the codeword with the higher modulation and coding scheme (MCS). If the MCS indices of the two codewords are the same, the PTRS antenna port is associated with the lowest indexed DMRS antenna port assigned for codeword with index 0.

SUMMARY

An objective of embodiments of the invention is to provide a solution which mitigates or solves the drawbacks and problems of conventional solutions.

The above and further objectives are solved by the subject matter of the independent claims. Further advantageous embodiments of the invention can be found in the dependent claims.

According to a first aspect of the invention, the above mentioned and other objectives are achieved with a client device for a wireless communication system, the client device being configured to obtain configuration information related to a set of phase tracking reference signal (PTRS) antenna ports, obtain control information indicating at least one of one or more codewords, a set of demodulation reference signal (DMRS) antenna ports assigned to the one or more codewords, and transmission configuration indication (TCI) information indicating one or more TCI states, determine an association between the set of PTRS antenna ports and the set of DMRS antenna ports based on the configuration information related to the set of PTRS antenna ports and the control information.

The configuration information related to a set of PTRS can e.g. indicate whether the client device can expect PTRS transmissions or not.

The control information stated above can e.g. be downlink control information in Uu communication or sidelink control information in sidelink communication. The control information can be transmitted from a serving device to the client device.

The meaning of the expression "one or more codewords" can e.g. in NR mean one or two codewords.

That a PTRS antenna port is associated with a DMRS antenna port can in this disclosure be understood to mean that the associated DMRS antenna port is also used for transmission of the PTRS.

An advantage of the client device according to the first aspect is that it addresses the open issue of PTRS antenna port association to DMRS antenna ports when multiple PTRS antenna ports are scheduled in multiple TRPs, multiple panels or multiple beams transmission scenario. Further, the PTRS antenna ports provide references for phase tracking from multiple TRPs, multiple panels or multiple beams. Also, the client device according to the first aspect is backward compatible and implies minor specification impacts to standard.

In an implementation form of a client device according to the first aspect, the set of DMRS antenna ports are assigned for one codeword and further split into a first subset of DMRS antenna ports and a second subset of DMRS antenna ports, wherein a first PTRS antenna port in the set of PTRS antenna ports is associated with a DMRS antenna port having a specific index in the first subset of DMRS antenna ports and a second PTRS antenna port in the set of PTRS antenna ports is associated with a DMRS antenna port having a specific index in the second subset of DMRS antenna ports.

A specific index can here mean the highest index or the lowest index.

An advantage with this implementation form is that when a single codeword is scheduled the PTRS antenna ports can be utilized as phase tracking reference signal for channel estimation.

In an implementation form of a client device according to the first aspect, the TCI information indicates one TCI state, and wherein the first subset of DMRS antenna ports belong to a first code division multiplexing (CDM) group and the second subset of DMRS antenna ports belong to one or more CDM groups other than the first CDM group.

An advantage with this implementation form is that the existing CDM group concept can be used for splitting the set of DMRS antenna ports into subsets, hence simplify the generation of subsets.

In an implementation form of a client device according to the first aspect, the TCI information indicates two TCI states, and wherein the first subset of DMRS antenna ports belong to a first CDM group and the second subset of DMRS antenna ports belong to one or more CDM groups other than the first CDM group.

An advantage with this implementation form is that the existing TCI state concept can be used for splitting the set of DMRS antenna ports into subsets, hence simplify the generation of subsets.

In an implementation form of a client device according to the first aspect, the TCI information indicates one TCI state, and wherein the first subset of DMRS antenna ports and the second subset of DMRS antenna ports are given by a radio resource control (RRC) configuration.

An advantage with this implementation form is that scheduling flexibility can be enhanced by RRC signaling since the subsets are given by the RRC configuration.

In an implementation form of a client device according to the first aspect, the TCI information indicates two TCI states, and wherein the first subset of DMRS antenna ports and the second subset of DMRS antenna ports are given by a RRC configuration.

An advantage with this implementation form is that scheduling flexibility can be enhanced by RRC signaling since the subsets are given by the RRC configuration.

In an implementation form of a client device according to the first aspect, the configuration information related to a set of PTRS antenna ports comprises the RRC configuration.

The configuration information can be transmitted from a serving device to the client device.

An advantage with this implementation form is that compared to low layer signaling, such as medium access control (MAC) control element (CE), the control overhead can be reduced when the configuration information comprises the RRC configuration.

In an implementation form of a client device according to the first aspect, the TCI information indicates a first TCI state and a second TCI state, wherein the first subset of DMRS antenna ports are associated with the first TCI state and the second subset of DMRS antenna ports are associated with the second TCI state.

An advantage with this implementation form is that the existing TCI state and the CDM group concepts can be used for splitting the set of DMRS antenna ports into subsets, hence simplify the generation of subsets.

In an implementation form of a client device according to the first aspect, the set of DMRS antenna ports are assigned a first codeword and a second codeword, wherein a first PTRS antenna port in the set of PTRS antenna ports is associated with a DMRS antenna port in the set of DMRS antenna ports having a specific index assigned for the first codeword and a second PTRS antenna port in the set of PTRS antenna ports is associated with a DMRS antenna port in the set of DMRS antenna ports having a specific index assigned for the second codeword.

An advantage with this implementation form is that minimum specification changes are needed to resolve the PTRS antenna port association issue.

In an implementation form of a client device according to the first aspect, the client device is further configured to obtain the configuration information related to the set of PTRS antenna ports from higher layer signalling, and obtain the control information in a physical downlink control channel, PDCCH, associated with a physical downlink shared channel, PDSCH.

However, in sidelink communication the PDCCH corresponds to the physical sidelink control channel (PSCCH) and the PDSCH to the physical sidelink shared channel (PSSCH).

An advantage with this implementation form is that existing channels and protocol can be used and therefore simplifying the implementation of the present solution.

In an implementation form of a client device according to the first aspect, the set of PTRS antenna ports and the set of DMRS antenna ports are scheduled for the PDSCH.

An advantage with this implementation form is that existing channels and protocol can be used and therefore simplifying the implementation of the present solution.

According to a second aspect of the invention, the above mentioned and other objectives are achieved with a serving device for a wireless communication system, the serving device being configured to provide configuration information related to a set of PTRS antenna ports, provide control information indicating at least one of one or more codewords, a set of DMRS antenna ports assigned to the one or more codewords, and TCI information indicating one or more TCI states, wherein an association between the set of PTRS antenna ports and the set of DMRS antenna ports is determined based on the configuration information related to a set of PTRS antenna ports and the control information.

An advantage of the serving device according to the second aspect is that it addresses the open issue of PTRS antenna port association to DMRS antenna ports when multiple PTRS antenna ports are scheduled in multiple TRPs, multiple panels or multiple beams transmission scenario. Further, the PTRS antenna ports provide references for phase tracking from multiple TRPs, multiple panels or multiple beams.

In an implementation form of a serving device according to the second aspect, the set of DMRS antenna ports are assigned for one codeword and further split into a first subset of DMRS antenna ports and a second subset of DMRS antenna ports, wherein a first PTRS antenna port in the set of PTRS antenna ports is associated with a DMRS antenna port having a specific index in the first subset of DMRS antenna ports and a second PTRS antenna port in the set of PTRS antenna ports is associated with a DMRS antenna port having a specific index in the second subset of DMRS antenna ports.

An advantage with this implementation form is that when a single codeword is scheduled the PTRS antenna ports can be utilized as phase tracking reference signal for channel estimation.

In an implementation form of a serving device according to the second aspect, the TCI information indicates one TCI state, and wherein the first subset of DMRS antenna ports belong to a first CDM group and the second subset of DMRS antenna ports belong to one or more CDM groups other than the first CDM group.

An advantage with this implementation form is that the existing CDM group concept can be used for splitting the set of DMRS antenna ports into subsets, hence simplify the generation of subsets.

In an implementation form of a serving device according to the second aspect, the TCI information indicates two TCI states, and wherein the first subset of DMRS antenna ports belong to a first CDM group and the second subset of DMRS antenna ports belong to one or more CDM groups other than the first CDM group.

An advantage with this implementation form is that the existing TCI state concept can be used for splitting the set of DMRS antenna ports into subsets, hence simplify the generation of subsets.

In an implementation form of a serving device according to the second aspect, the TCI information indicates one TCI state, and wherein the serving device is further configured to provide RRC configuration indicating the first subset of DMRS antenna ports and the second subset of DMRS antenna ports.

An advantage with this implementation form is that scheduling flexibility can be enhanced by RRC signaling since the subsets are given by the RRC configuration.

In an implementation form of a serving device according to the second aspect, the TCI information indicates two TCI states, and wherein the serving device is further configured to provide RRC configuration indicating the first subset of DMRS antenna ports and the second subset of DMRS antenna ports.

An advantage with this implementation form is that scheduling flexibility can be enhanced by RRC signaling since the subsets are given by the RRC configuration.

In an implementation form of a serving device according to the second aspect, the serving device is further configured to provide the RRC configuration in the configuration information related to a set of PTRS antenna ports.

An advantage with this implementation form is that compared to low layer signaling the control overhead can be reduced when the configuration information comprises the RRC configuration.

In an implementation form of a serving device according to the second aspect, the TCI information indicates a first TCI state and a second TCI state, wherein the first subset of DMRS antenna ports are associated with the first TCI state and the second subset of DMRS antenna ports are associated with the second TCI state.

An advantage with this implementation form is that the existing TCI state and the CDM group concepts can be used for splitting the set of DMRS antenna ports into subsets, hence simplify the generation of subsets.

In an implementation form of a serving device according to the second aspect, the set of DMRS antenna ports are assigned a first codeword and a second codeword, wherein a first PTRS antenna port in the set of PTRS antenna ports is associated with a DMRS antenna port in the set of DMRS antenna ports having a specific index assigned for the first codeword and a second PTRS antenna port in the set of PTRS antenna ports is associated with a DMRS antenna port in the set of DMRS antenna ports having a specific index assigned for the second codeword.

An advantage with this implementation form is that minimum specification changes are needed to resolve the PTRS antenna port association issue.

In an implementation form of a serving device according to the second aspect, the serving device is further configured to provide the configuration information related to the set of PTRS antenna ports through higher layer signalling, and provide the control information in a PDCCH associated with a PDSCH.

An advantage with this implementation form is that existing channels and protocol can be used and therefore simplifying the implementation of the present solution.

In an implementation form of a serving device according to the second aspect, the set of PTRS antenna ports and the set of DMRS antenna ports are scheduled for the PDSCH.

An advantage with this implementation form is that existing channels and protocol can be used and therefore simplifying the implementation of the present solution.

According to a third aspect of the invention, the above mentioned and other objectives are achieved with a method for a client device, the method comprises obtaining configuration information related to a set of PTRS antenna ports, obtaining control information indicating at least one of one or more codewords, a set of DMRS antenna ports assigned to the one or more codewords, and TCI information indicating one or more TCI states, determining an association between the set of PTRS antenna ports and the set of DMRS antenna ports based on the configuration information related to the set of PTRS antenna ports and the control information.

The method according to the third aspect can be extended into implementation forms corresponding to the implementation forms of the client device according to the first aspect. Hence, an implementation form of the method comprises the feature(s) of the corresponding implementation form of the client device.

The advantages of the methods according to the third aspect are the same as those for the corresponding implementation forms of the client device according to the first aspect.

According to a fourth aspect of the invention, the above mentioned and other objectives are achieved with a method for a serving device, the method comprises providing configuration information related to a set of PTRS antenna ports, providing control information indicating at least one of one or more codewords, a set of DMRS antenna ports assigned to the one or more codewords, and TCI information indicating one or more TCI states, wherein an association between the set of PTRS antenna ports and the set of DMRS antenna ports is determined based on the configuration information related to a set of PTRS antenna ports and the control information.

The method according to the fourth aspect can be extended into implementation forms corresponding to the implementation forms of the serving device according to the second aspect. Hence, an implementation form of the method comprises the feature(s) of the corresponding implementation form of the serving device.

The advantages of the methods according to the fourth aspect are the same as those for the corresponding implementation forms of the serving device according to the second aspect.

According to a further aspect, the above mentioned and other objectives are achieved with a non-transitory machine-readable storage medium having stored thereon processor-executable instructions, which when executed by a processor of a device, cause the device to implement a method according to embodiments of the invention.

The invention also relates to a computer program, characterized in program code, which when run by at least one processor causes said at least one processor to execute any method according to embodiments of the invention. Further, the invention also relates to a computer program product comprising a computer readable medium and said mentioned computer program, wherein said computer program is included in the computer readable medium, and comprises of one or more from the group: ROM (Read-Only Memory), PROM (Programmable ROM), EPROM (Erasable PROM), Flash memory, EEPROM (Electrically EPROM) and hard disk drive.

Further applications and advantages of the embodiments of the invention will be apparent from the following detailed description.

BRIEF DESCRIPTION OF THE DRAWINGS

The appended drawings are intended to clarify and explain different embodiments of the invention, in which.

DETAILED DESCRIPTION OF ILLUSTRATIVE EMBODIMENTS

As aforementioned, in 3GPP NR a PTRS antenna port is associated with a DMRS antenna port. However, it has been recognized by the inventors that the PTRS antenna port is very tightly linked to a DMRS antenna port group. Further, the inventors have also identified the issue that one PTRS antenna port can be associated with two different DMRS antenna port groups which leads to conflicts with the concept of quasi co-location. Furthermore, in later specifications it is specified that the PTRS antenna port should be associated with one DMRS antenna port among DMRS antenna ports for one codeword which makes it difficult to be extended in to multi-TRP, multi panel, and/or multi beam scenarios, e.g., if there is only one codeword with different layers from different TRPs.

Hence there is a need for methods and devices overcoming the shortcomings and drawbacks of conventional solutions.

Figure 1:
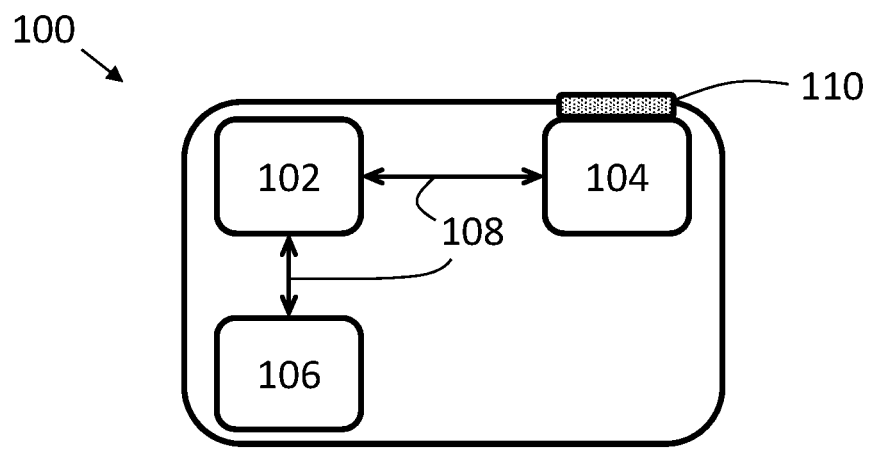
FIG. 1 shows a client device according to an embodiment/example of the invention.

FIG. 1 shows a client device 100 according to an embodiment of the invention. In the embodiment shown in FIG. 1, the client device 100 comprises a processor 102, a transceiver 104 and a memory 106. The processor 102 is coupled to the transceiver 104 and the memory 106 by communication means 108 known in the art. The client device 100 further comprises an antenna or antenna array 110 coupled to the transceiver 104, which means that the client device 100 is configured for wireless communications in a wireless communication system. That the client device 100 is configured to perform certain actions can in this disclosure be understood to mean that the client device 100 comprises suitable means, such as e.g. the processor 102 and the transceiver 104, configured to perform said actions.

The client device 100 in this disclosure includes but is not limited to: a UE such as smart phones, a cellular phone, a cordless phone, a Session Initiation Protocol (SIP) phone, a Wireless Local Loop (WLL) station, a Personal Digital Assistant (PDA), a handheld device having a wireless communication function, a computing device or another processing device connected to a wireless modem, an in-vehicle device, a wearable device, integrated access and backhaul node (JAB) such as mobile car or equipment installed in a car, drone, device-to-device (D2D) device, wireless cameras, mobile station, access terminal, user unit, wireless communication device, station of wireless local access network (WLAN), wireless enabled tablet computers, laptop-embedded equipment, USB dongles, wireless customer-premises equipment (CPE), and/or chipset. In an Internet of things (IOT) scenario, the client device 100 may represent a machine or other device or chipset which performs communication with other wireless device and/or a network equipment.

The UE may further be referred to as mobile telephone, cellular telephone, computer tablet or laptop with wireless capability. The UE in this context may be, for example, portable, pocket-storable, hand-held, computer-comprised, or vehicle-mounted mobile device, enabled to communicate voice and/or data, via the radio access network, with another entity, such as another receiver or a server. The UE can be a Station (STA), which is any device that contains an IEEE 802.11-conformant Media Access Control (MAC) and Physical Layer (PHY) interface to the Wireless Medium (WM). The UE may also be configured for communication in 3GPP related LTE and LTE-Advanced, in WiMAX and its evolution, and in fifth generation wireless technologies, such as NR.

The processor 102 may be referred to as one or more general-purpose central processing unit (CPU), one or more digital signal processor (DSP), one or more application-specific integrated circuit (ASIC), one or more field programmable gate array (FPGA), one or more programmable logic device, one or more discrete gate, one or more transistor logic device, one or more discrete hardware component, one or more chipset.

The memory 106 may be a read-only memory, a random access memory, or a non-volatile random access memory (NVRAM). The transceiver 104 may be a transceiver circuit, a power controller, an antenna, or an interface which communicates with other modules or devices. In embodiments, the transceiver 104 may be a separate chipset, or it is integrated with processor in one chipset. While in some implementations, the transceiver 104, the memory 106 and the processor 102 are integrated in one chipset.

According to embodiments of the invention, the client device 100 is configured to obtain configuration information related to a set of PTRS antenna ports. The client device 100 is further configured to obtain control information indicating at least one of one or more codewords, a set of DMRS antenna ports assigned to the one or more codewords, and TCI information indicating one or more TCI states. The client device 100 is further configured to determine an association between the set of PTRS antenna ports and the set of DMRS antenna ports based on the configuration information related to the set of PTRS antenna ports and the control information.

Figure 2:
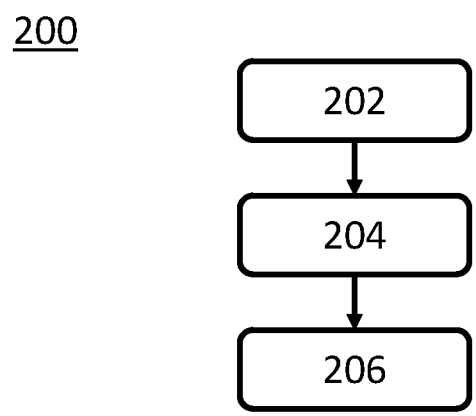
FIG. 2 shows a method for a client device according to an embodiment of the invention.

FIG. 2 shows a flow chart of a corresponding method 200 which may be executed in a client device 100, such as the one shown in FIG. 1. The method 200 comprises obtaining 202 configuration information related to a set of PTRS antenna ports. The method 200 further comprises obtaining 204 control information indicating at least one of one or more codewords, a set of DMRS antenna ports assigned to the one or more codewords, and TCI information indicating one or more TCI states. The method 200 further comprises determining 206 an association between the set of PTRS antenna ports and the set of DMRS antenna ports based on the configuration information related to the set of PTRS antenna ports and the control information.

The configuration information related to a set of PTRS can e.g. indicate whether the client device can expect PTRS transmissions or not.

The control information stated above can e.g. be downlink control information in Uu communication or sidelink control information in sidelink communication. The control information can be transmitted from a serving device 300 (see FIG. 3) to the client device 100.

Further, the meaning of the expression "one or more codewords" can e.g. in NR mean one or two codewords.

That a PTRS antenna port is associated with a DMRS antenna port can in this disclosure be understood to mean that the associated DMRS antenna port is also used for transmission of the PTRS. Further, in NR DMRS antenna port(s) associated with a PTRS antenna port are assumed to be quasi co-located with respect to {"QCL-TypeA" and "QCL-TypeD" }, where "QCL-TypeA" corresponds to {Doppler shift, Doppler spread, average delay, delay spread} and "QCL-TypeD" corresponds to {Spatial Rx parameter}.

Figure 3:
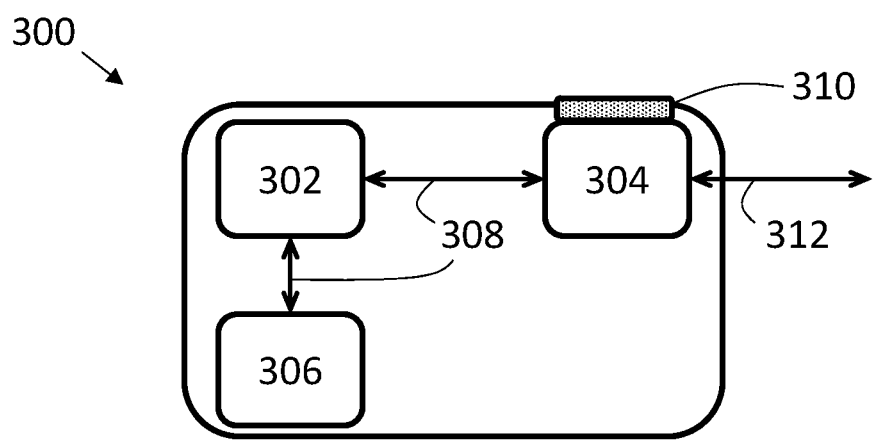
FIG. 3 shows a serving device according to an embodiment of the invention.

FIG. 3 shows a serving device 300 according to an embodiment of the invention. In the embodiment shown in FIG. 3, the serving device 300 comprises a processor 302, a transceiver 304 and a memory 306. The processor 302 is coupled to the transceiver 304 and the memory 306 by communication means 308 known in the art. The serving device 300 may be configured for both wireless and wired communications in wireless and wired communication systems, respectively. The wireless communication capability is provided with an antenna or antenna array 310 coupled to the transceiver 304, while the wired communication capability is provided with a wired communication interface 312 coupled to the transceiver 304. That the serving device 300 is configured to perform certain actions can in this disclosure be understood to mean that the serving device 300 comprises suitable means, such as e.g. the processor 302 and the transceiver 304, configured to perform said actions.

The serving device 300 in this disclosure includes but is not limited to: NodeB in Wideband Code Division Multiple Access (WCDMA) system, an Evolutional Node B (eNB) or evolved NodeB (eNodeB) in LTE system, or a relay node or an access point, or an in-vehicle device, a wearable device, or a next generation NodeB (gNB) or a network control node in a fifth generation (5G) network configured to control one or more TRPs.

Further, the serving device 300 herein may be denoted as a radio network access node, an access network access node, an access point, or a base station, e.g. a Radio Base Station (RBS), which in some networks may be referred to as transmitter, "gNB", "gNodeB", "eNB", "eNodeB", "NodeB" or "B node", depending on the technology and terminology used. The radio network access nodes may be of different classes such as e.g. macro eNodeB, home eNodeB or pico base station, based on transmission power and thereby also cell size. The radio network access node can be a Station (STA), which is any device that contains an IEEE 802.11-conformant Media Access Control (MAC) and Physical Layer (PHY) interface to the Wireless Medium (WM). The radio network access node may also be a base station corresponding to the fifth generation (5G) wireless systems.

The serving device 300 herein may also be denoted as a transmitter (TX) UE or a source node in sidelink communications which means that the client device can act as a receiving (RX) UE. In such cases the PDCCH mentioned herein corresponds to the physical sidelink control channel (PSCCH) and the PDSCH to the physical sidelink shared channel (PSSCH).

The processor 302 may be referred to as one or more general-purpose CPU, one or more digital signal processor (DSP), one or more application-specific integrated circuit (ASIC), one or more field programmable gate array (FPGA), one or more programmable logic device, one or more discrete gate, one or more transistor logic device, one or more discrete hardware component, one or more chipset.

The memory 306 may be a read-only memory, a random access memory, or a non-volatile random access memory (NVRAM). The transceiver 304 may be a transceiver circuit, a power controller, an antenna, or an interface which communicates with other modules or devices. In some embodiments, the transceiver 304 may be a separate chipset, or it is integrated with processor in one chipset. While in some implementations, the transceiver 304, the memory 306 and the processor 302 are integrated in one chipset.

According to embodiments of the invention the serving device 300 is configured to provide configuration information related to a set of PTRS antenna ports. The serving device 300 is further configured to provide control information indicating at least one of one or more codewords, a set of DMRS antenna ports assigned to the one or more codewords, and TCI information indicating one or more TCI states. The association between the set of PTRS antenna ports and the set of DMRS antenna ports is according to the invention determined based on the configuration information related to a set of PTRS antenna ports and the control information.

Figure 4:
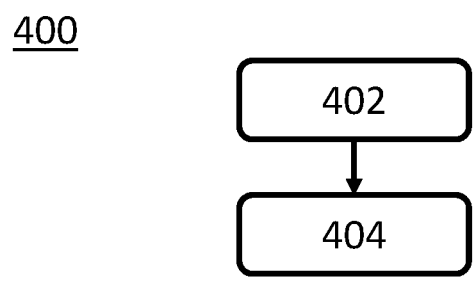
FIG. 4 shows a method for a serving device according to an embodiment of the invention.

FIG. 4 shows a flow chart of a corresponding method 400 which may be executed in a serving device 300, such as the one shown in FIG. 3. The method 400 comprises providing 402 configuration information related to a set of PTRS antenna ports. The method 400 further comprises providing 404 control information indicating at least one of one or more codewords, a set of DMRS antenna ports assigned to the one or more codewords, and TCI information indicating one or more TCI states. The association between the set of PTRS antenna ports and the set of DMRS antenna ports is determined based on the configuration information related to a set of PTRS antenna ports and the control information.

Figures 5, 6:
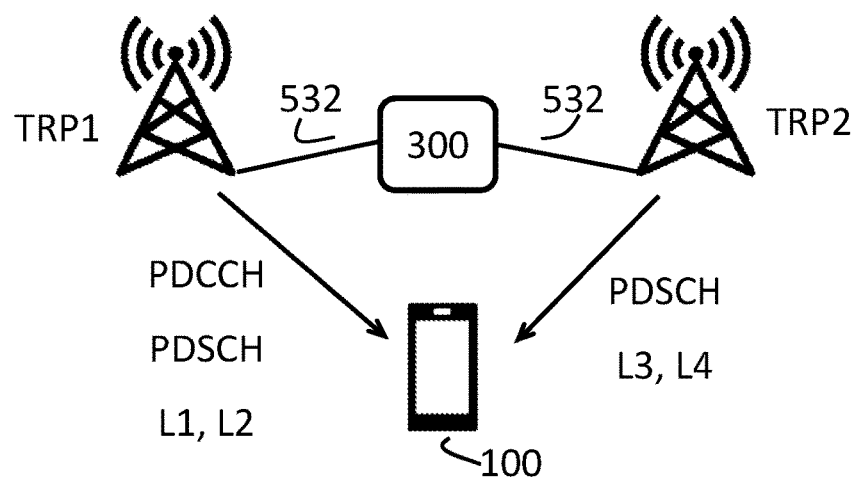
FIG. 5 shows a scenario when two TCI states are indicated according to an embodiment of the invention.
FIG. 6 illustrates the relationship between TCI states, scheduled DMRS antenna ports and PTRS antenna ports in the two TCI state scenario.

To provide even deeper understanding of embodiments of the invention two different scenarios in a wireless communication system 500 are described with reference to FIGS. 5 to 8. In FIGS. 5 and 6 a two TCI state scenario is illustrated whilst in FIGS. 7 and 8 a single TCI state is illustrated.

The embodiments disclosed herein are set in a NR context hence the terminology used, but it should be understood that the methods and devices according to embodiments of the invention may be implemented in any future or other wireless communication system, such as WLAN system. The methods and devices are not limited to NR and its terminology, hence different terminology may be used in other systems. Therefore, the terminology used in this disclosure are just for easiness of description. The wireless communication systems in this disclosure includes but is not limited to: WCDMA system, LTE, 5G or future wireless communication system.

A client device 100, corresponding to a UE in NR, is radio resource control (RRC) configured with a list of up to M candidate TCI states at least for the purposes of QCL indication. For QCL indication for PDSCH: when TCI states are used for QCL indication, the UE receives a N-bit TCI field in DCI. The UE assumes that the PDSCH DMRS is QCLed with the downlink reference signals in the reference signal set corresponding to the signaled TCI state. In NR Rel. 15, one TCI code point corresponds to only one TCI state. When TCI is enabled, the network, e.g. through gNB control signaling, indicates the TCI state to the UE, and the UE may assume that the DMRS antenna ports of PDSCH of a serving cell are quasi co-located with the reference signals in the TCI state with respect to the QCL type parameter(s) given by the indicated TCI state.

Furthermore, in NR Rel. 16 enhanced multiple input multiple output (eMIMO) feature is introduced which supports both single physical downlink control channel (PDCCH) based multi TRP transmission and multi PDCCH based multi TRP transmission. More specifically, for single PDCCH based multi TRP transmission, a single NR-PDCCH schedules a single NR-PDSCH where separate layers are transmitted from separate TRPs. It has been also agreed that each TCI code point in a DCI can correspond to 1 or 2 TCI states. A typical multi TRP transmission scenario scheduled by a single PDCCH is when 2 TCI states is indicated in a PDCCH.

Two TCI States

FIG. 5 shows a wireless communication system 500 according to an embodiment of the invention when two TCI states are indicated. In FIG. 5 a single PDCCH based multi TRP transmission with ideal backhaul is illustrated. The wireless communication system 500 in FIG. 5 comprises a serving device 300 acting as a network control node of a radio access network (RAN). The serving device 300 is connected to a first TRP (TRP1) and a second TRP (TRP2), respectively, e.g. via a backhaul link 532. The first and second TRPs are configured to be controlled by the serving device 300.

The first and second TRPs are configured to transmit data to a client device 100. Data layer 1 (L1) and data layer 2 (L2) are transmitted from TRP1 in a first spatial direction. Further, a PDCCH and its associated PDSCH is used for L1 and L2 transmission from TRP1 to the client device 100. Data layer 3 (L3) and data layer 4 (L4) on the other hand are transmitted from TRP2 in a second spatial direction different to the first spatial direction to the client device 100. Further, the PDSCH is used for L3 and L4 transmission from TRP2 to the client device 100.

Hence, all the DMRS antenna ports assigned for the PDSCH have to be split into two different groups, each of which is associated with a separate TCI state. In the two codeword case, it is natural to schedule one codeword from each TRP, respectively. Therefore, in a non-limiting example, first and second codewords are transmitted from separate TRPs. For example, in FIG. 5 the first codeword is transmitted from TRP1 and the second codeword is transmitted from TRP2.

The relationship between TCI states, scheduled DMRS antenna ports and PTRS antenna ports is further illustrated in FIG. 6. Either one or two codewords can be scheduled by the network in this example. In a first case two TCI states are indicated in a single TCI codepoint, meanwhile two PTRS antenna ports are scheduled for a single codeword scheduling. In a second case two TCI states are indicated and two PTRS antenna ports are scheduled for two codewords.

The PTRS antenna ports association with DMRS antenna ports can for a single codeword be realized by splitting/dividing the set of DMRS antenna ports into a first subset of DMRS antenna ports and a second subset of DMRS antenna ports.

In embodiments, the first subset of DMRS antenna ports belong to a first code division multiplexing (CDM) group and the second subset of DMRS antenna ports belong to one or more CDM groups other than the first CDM group. For instance, there are two types of DMRS configurations in NR specification. For DMRS configuration type1, DMRS port sets indexing in two CDM groups are {0,1,4,5} and {2,3,6,7} for two symbol DMRS, {0,1} and {2,3} for one symbol DMRS. For DMRS configuration type2, DMRS port sets indexing in three CDM groups are {0,1,6,7}, {2,3,8,9}, and {4,5,10,11} for two symbol DMRS, {0,1}, {2,3}, and {4,5} for one symbol DMRS. If DMRS antenna ports 0, 1, and 2 are indicated, then port 0 and port 1 belong to the first CDM group while port 2 belongs to other CDM groups other than CDM group 0. In another example, port 2 belongs to the first CDM group while port 0 and port 1 belong to other CDM groups other than the first CDM group 2.

In embodiments, the first subset of DMRS antenna ports are associated with the first TCI state and the second subset of DMRS antenna ports are associated with the second TCI state. For instance, each TCI state is associated with a set of DMRS antenna ports. The first subset of DMRS antenna ports can be associated with a first TCI state associated with a set of DMRS antenna ports, and the first subset of DMRS antenna ports can be associated with a second TCI state associated with another set of DMRS antenna ports.

In embodiments, the first subset of DMRS antenna ports and the second subset of DMRS antenna ports are given by a RRC configuration. In embodiments the UE is configured to obtain the configuration information related to the set of PTRS antenna ports from higher layer signalling. For example in current specification 38.214 it is stated that if a UE is not configured with the higher layer parameter phaseTrackingRS in DMRS-DownlinkConfig, the UE assumes that PTRS is not present. This means that the UE expects PTRS transmission when it is configured with the parameter phaseTrackingRS in DMRS-DownlinkConfig. The UE is further configured to obtain the control information, such as DCI, in a PDCCH associated with a PDSCH. Therefore, according to this embodiment, the configuration information related to a set of PTRS antenna ports comprises the RRC configuration. For instance, in RRC signalling it can designate a specific DMRS antenna port grouping explicitly, e.g., {0,1,4,5} and {2,3,6,7} are the first and the second subset of DMRS antenna ports, respectively.

When the set of DMRS antenna ports have been split into the first and second subset as explained above, the antenna port association rule disclosed herein can be formulated as: a first PTRS antenna port in the set of PTRS antenna ports is associated with a DMRS antenna port having a specific index in the first subset of DMRS antenna ports and a second PTRS antenna port in the set of PTRS antenna ports is associated with a DMRS antenna port having a specific index in the second subset of DMRS antenna ports.

The specific index is in embodiments either the highest index or the lowest index. Hence, according to mentioned embodiments a first PTRS antenna port in the set of PTRS antenna ports is associated with a DMRS antenna port having the highest index or the lowest index in the first subset of DMRS antenna ports and a second PTRS antenna port in the set of PTRS antenna ports is associated with a DMRS antenna port having the highest index or the lowest index in the second subset of DMRS antenna ports.

Furthermore, in the two codeword case, i.e. a first codeword and a second codeword, when two TCI states are indicated, a first PTRS antenna port in the set of PTRS antenna ports is associated with a DMRS antenna port in the set of DMRS antenna ports having a specific index assigned for the first codeword and a second PTRS antenna port in the set of PTRS antenna ports is associated with a DMRS antenna port in the set of DMRS antenna ports having a specific index assigned for the second codeword. Also, for these cases the specific index is in embodiments either the highest index or the lowest index. Hence, according to mentioned embodiments a first PTRS antenna port in the set of PTRS antenna ports is associated with a DMRS antenna port in the set of DMRS antenna ports having the highest index or the lowest index assigned for the first codeword and a second PTRS antenna port in the set of PTRS antenna ports is associated with a DMRS antenna port in the set of DMRS antenna ports having the highest index or the lowest index assigned for the second codeword.

Single TCI State Case

Figure 7:
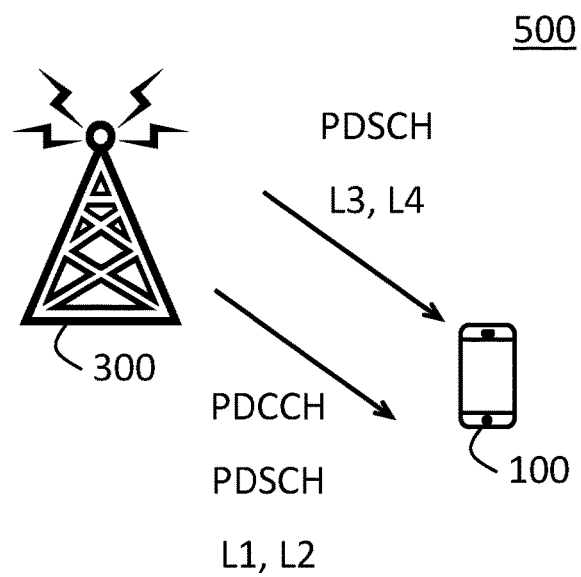
FIG. 7 shows scenario when a single TCI state is indicated according to an embodiment of the invention.

FIG. 7 shows a wireless communication system 500 according to an embodiment of the invention. The wireless communication system 500 in FIG. 6 comprises a client device 100 and a serving device 300 configured to operate in the wireless communication system 500. For simplicity, the wireless communication system 500 shown in FIG. 7 only comprises one client device 100 and one serving device 300. However, the wireless communication system 500 may comprise any number of client devices 100 and any number of serving device 300 without deviating from the scope of the invention.

In the wireless communication system 500, the serving device 300 is represented as a network access node, such as a gNB TRP in NR systems. FIG. 7 illustrates a single PDCCH based multi panel transmission and the gNB TRP transmits multiple data layers to a UE 100. Data layer 1 and layer 2 are transmitted from one panel (not shown) of the gNB TRP in one spatial direction while data layer 3 and 4 are transmitted from another panel (not shown) of the gNB TRP in the same spatial direction, so that all the DMRS antenna ports assigned for the PDSCH is associated with a single TCI state. Even in a case where the network schedules two TCI states, one TCI state can be used as dummy TCI state when associating the TCI states with DMRS ports. It is also noted that the single PDCCH is transmitted from one panel of the gNB TRP.

Figure 8:
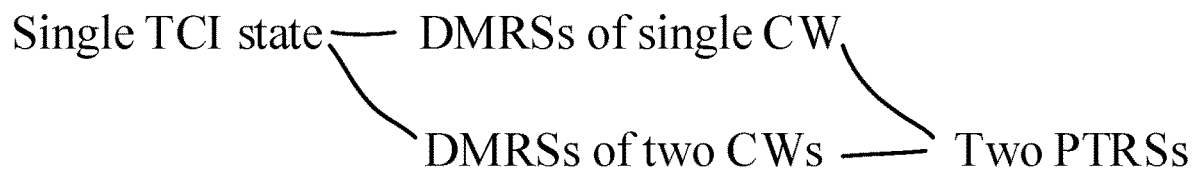
FIG. 8 illustrates the relationship between TCI states, scheduled DMRS antenna ports and PTRS antenna ports in the single TCI state scenario.

The relationship between TCI state, scheduled DMRS antenna ports and PTRS antenna ports is illustrated in FIG. 8. Either one or two codewords can be scheduled by the network. In a first case when a single TCI state is indicated in a single TCI codepoint, two PTRS antenna ports are scheduled for a single codeword scheduling. In a second case in FIG. 8, there are two PTRS antenna ports scheduled for two codewords.

Also, for the single TCI indication, the PTRS antenna ports association with DMRS antenna ports can for a single codeword be realized by splitting the set of DMRS antenna ports into a first subset of DMRS antenna ports and a second subset of DMRS antenna ports.

In embodiments, the first subset of DMRS antenna ports belong to a first CDM group and the second subset of DMRS antenna ports belong to one or more CDM groups other than the first CDM group.

In embodiments, the first subset of DMRS antenna ports and the second subset of DMRS antenna ports are given by a RRC configuration. In embodiments the client device 100 is configured to obtain the configuration information related to the set of PTRS antenna ports from higher layer signalling, and to obtain the DCI in a PDCCH associated with a PDSCH. Therefore, according to this embodiment, the configuration information related to a set of PTRS antenna ports comprises the RRC configuration.

When the set of DMRS antenna ports have been split into the first and second subset as explained above, the antenna port association rule can be formulated as: a first PTRS antenna port in the set of PTRS antenna ports is associated with a DMRS antenna port having a specific index in the first subset of DMRS antenna ports and a second PTRS antenna port in the set of PTRS antenna ports is associated with a DMRS antenna port having a specific index in the second subset of DMRS antenna ports.

The specific index is in embodiments either the highest index or the lowest index. Hence, according to mentioned embodiments a first PTRS antenna port in the set of PTRS antenna ports is associated with a DMRS antenna port having the highest index or the lowest index in the first subset of DMRS antenna ports and a second PTRS antenna port in the set of PTRS antenna ports is associated with a DMRS antenna port having the highest index or the lowest index in the second subset of DMRS antenna ports.

Furthermore, in the two codeword case, i.e. a first codeword and a second codeword, when a single TCI states is indicated, a first PTRS antenna port in the set of PTRS antenna ports is associated with a DMRS antenna port in the set of DMRS antenna ports having a specific index assigned to the first codeword and a second PTRS antenna port in the set of PTRS antenna ports is associated with a DMRS antenna port in the set of DMRS antenna ports having a specific index assigned to the second codeword. Also, for these cases the specific index is in embodiments either the highest index or the lowest index. Hence, according to mentioned embodiments a first PTRS antenna port in the set of PTRS antenna ports is associated with a DMRS antenna port in the set of DMRS antenna ports having the highest index or the lowest index assigned to the first codeword and a second PTRS antenna port in the set of PTRS antenna ports is associated with a DMRS antenna port in the set of DMRS antenna ports having the highest index or the lowest index assigned to the second codeword.

Standard Impact

It is envisaged that embodiments of the invention can be implemented in NR or any other suitable communication standard. In NR TS38.214 f60 section 5.1.6.3 could be revised. Below in the section between "START OF CHANGE" and "END OF CHANGE" is a non-limiting example how said section could be revised to comply with embodiments of the invention.

Start of Change

The DL DM-RS port(s) associated with a PTRS port are assumed to be quasi co-located with respect to {'QCL-TypeA' and 'QCL-TypeD'}.

When only one PTRS port is scheduled, if a UE is scheduled with one codeword, the PTRS antenna port is associated with the lowest indexed DM-RS antenna port among the DM-RS antenna ports assigned for the PDSCH. If a UE is scheduled with two codewords, the PTRS antenna port is associated with the lowest indexed DM-RS antenna port among the DM-RS antenna ports assigned for the codeword with the higher MCS. If the MCS indices of the two codewords are the same, the PTRS antenna port is associated with the lowest indexed DM-RS antenna port assigned for codeword 0.

When two PTRS ports are scheduled, if a UE is scheduled with one codeword, each PTRS antenna port is associated with the lowest indexed DM-RS antenna port among the DM-RS antenna ports configured by RRC and assigned for the PDSCH. If a UE is scheduled with two codewords, each PTRS antenna port is associated with the lowest indexed DM-RS antenna port among the DM-RS antenna ports and assigned for each codeword.

End of Change

Furthermore, any method according to embodiments of the invention may be implemented in a computer program, having code means, which when run by processing means causes the processing means to execute the steps of the method. The computer program is included in a computer readable medium of a computer program product. The computer readable medium may comprise essentially any memory, such as a ROM (Read-Only Memory), a PROM (Programmable Read-Only Memory), an EPROM (Erasable PROM), a Flash memory, an EEPROM (Electrically Erasable PROM), or a hard disk drive.

Moreover, it is realized by the skilled person that embodiments of the client device 100 and the serving device 300 comprises the necessary communication capabilities in the form of e.g., functions, means, units, elements, etc., for performing the solution. Examples of other such means, units, elements and functions are: processors, memory, buffers, control logic, encoders, decoders, rate matchers, de-rate matchers, mapping units, multipliers, decision units, selecting units, switches, interleavers, de-interleavers, modulators, demodulators, inputs, outputs, antennas, amplifiers, receiver units, transmitter units, DSPs, MSDs, TCM encoder, TCM decoder, power supply units, power feeders, communication interfaces, communication protocols, etc. which are suitably arranged together for performing the solution.

Especially, the processor(s) of the client device 100 and the serving device 300 may comprise, e.g., one or more instances of a Central Processing Unit (CPU), a processing unit, a processing circuit, a processor, an Application Specific Integrated Circuit (ASIC), a microprocessor, or other processing logic that may interpret and execute instructions. The expression "processor" may thus represent a processing circuitry comprising a plurality of processing circuits, such as, e.g., any, some or all of the ones mentioned above. The processing circuitry may further perform data processing functions for inputting, outputting, and processing of data comprising data buffering and device control functions, such as call processing control, user interface control, or the like.

Finally, it should be understood that the invention is not limited to the embodiments described above, but also relates to and incorporates all embodiments within the scope of the appended independent claims.

What is claimed is:

1. A client device for a wireless communication system, comprising:
   a processor; and
   a non-transitory computer readable medium storing a program for execution by the processor, the program including instructions to:
   obtain configuration information related to a set of phase tracking reference signal (PTRS) antenna ports;
   obtain control information indicating at least one of one or more codewords, a set of demodulation reference signal (DMRS) antenna ports assigned to the one or more codewords, or transmission configuration indication (TCI) information indicating one or more TCI states; and
   determine an association between the set of PTRS antenna ports and the set of DMRS antenna ports based on the configuration information related to the set of PTRS antenna ports and the control information, wherein the association between the set of PTRS antenna ports and the set of DMRS antenna ports indicates that a DMRS antenna port of the set of DMRS antenna ports associated with a PTRS antenna port is used for transmission of a PTRS, wherein in response to only one PTRS port and one codeword being scheduled, the PTRS antenna port is associated with a lowest indexed DMRS antenna port of the set of DMRS antenna ports, wherein in response to only one PTRS port and two codewords being scheduled, and further in response to modulation and coding scheme (MCS) indices of the two codewords being different, the PTRS antenna port is associated with the lowest indexed DMRS antenna port among the set of DMRS antenna ports assigned for the codeword with a higher MCS index, and wherein in response to only one PTRS port and two codewords being scheduled, and further in response to the MCS indices of the two codewords being same, the PTRS antenna port is associated with the lowest indexed DMRS antenna port assigned for codeword 0.

2. The client device according to claim 1, wherein the control information indicates the set of demodulation reference signal (DMRS) antenna ports, wherein the set of DMRS antenna ports is assigned for one codeword and is split into a first subset of DMRS antenna ports and a second subset of DMRS antenna ports, wherein a first PTRS antenna port of the set of PTRS antenna ports is associated with a DMRS antenna port having a specific index in the first subset of DMRS antenna ports, and wherein a second PTRS antenna port of the set of PTRS antenna ports is associated with a DMRS antenna port having a specific index in the second subset of DMRS antenna ports.

3. The client device according to claim 2, wherein the TCI information indicates one TCI state, wherein the first subset of DMRS antenna ports belongs to a first code division multiplexing (CDM) group, and wherein the second subset of DMRS antenna ports belongs to one or more CDM groups other than the first CDM group.

4. The client device according to claim 2, wherein the TCI information indicates two TCI states, wherein the first subset of DMRS antenna ports belongs to a first CDM group, and wherein the second subset of DMRS antenna ports belongs to one or more CDM groups other than the first CDM group.

5. The client device according to claim 2, wherein the TCI information indicates one TCI state, and wherein the first subset of DMRS antenna ports and the second subset of DMRS antenna ports are given by a radio resource control (RRC) configuration.

6. The client device according to claim 2, wherein the TCI information indicates two TCI states, and wherein the first subset of DMRS antenna ports and the second subset of DMRS antenna ports are given by a radio resource control (RRC) configuration.

7. The client device according to claim 6, wherein the configuration information related to a set of PTRS antenna ports comprises the RRC configuration.

8. The client device according to claim 2, wherein the TCI information indicates a first TCI state and a second TCI state, wherein the first subset of DMRS antenna ports is associated with the first TCI state, and wherein the second subset of DMRS antenna ports is associated with the second TCI state.

9. The client device according to claim 1, wherein the set of DMRS antenna ports is assigned a first codeword and a second codeword, wherein a first PTRS antenna port of the set of PTRS antenna ports is associated with a DMRS antenna port of the set of DMRS antenna ports having a specific index assigned to the first codeword, and wherein a second PTRS antenna port of the set of PTRS antenna ports is associated with a DMRS antenna port of the set of DMRS antenna ports having a specific index assigned to the second codeword.

10. The client device according to claim 1, wherein the program further includes instructions to:
   obtain, from higher layer signaling, the configuration information related to the set of PTRS antenna ports; and obtain the control information in a physical downlink control channel (PDCCH) associated with a physical downlink shared channel (PDSCH).

11. The client device according to claim 10, wherein the set of PTRS antenna ports and the set of DMRS antenna ports are scheduled for the PDSCH.

12. A serving device for a wireless communication system, comprising:
   a processor; and
   a non-transitory computer readable medium storing a program for execution by the processor, the program including instructions to:
   provide configuration information related to a set of phase tracking reference signal (PTRS) antenna ports; and
   provide control information indicating at least one of one or more codewords, a set of demodulation reference signal (DMRS) antenna ports assigned to the one or more codewords, or transmission configuration indication (TCI) information indicating one or more TCI states,
   wherein an association between the set of PTRS antenna ports and the set of DMRS antenna ports is determined based on the configuration information related to a set of PTRS antenna ports and the control information, and wherein the association between the set of PTRS antenna ports and the set of DMRS antenna ports indicates that a DMRS antenna port of the set of DMRS antenna ports associated with a PTRS antenna port is used for transmission of a PTRS, wherein in response to only one PTRS port and one codeword being scheduled, the PTRS antenna port is associated with a lowest indexed DMRS antenna port of the set of DMRS antenna ports, wherein in response to only one PTRS port and two codewords being scheduled, and further in response to modulation and coding scheme (MCS) indices of the two codewords being different, the PTRS antenna port is associated with the lowest indexed DMRS antenna port among the set of DMRS antenna ports assigned for the codeword with a higher MCS index, and wherein in response to only one PTRS port and two codewords being scheduled, and further in response to the MCS indices of the two codewords being same, the PTRS antenna port is associated with the lowest indexed DMRS antenna port assigned for codeword 0.

13. The serving device according to claim 12, wherein the set of DMRS antenna ports is assigned for one codeword and is split into a first subset of DMRS antenna ports and a second subset of DMRS antenna ports, wherein a first PTRS antenna port of the set of PTRS antenna ports is associated with a DMRS antenna port having a specific index in the first subset of DMRS antenna ports, and wherein a second PTRS antenna port of the set of PTRS antenna ports is associated with a DMRS antenna port having a specific index in the second subset of DMRS antenna ports.

14. The serving device according to claim 13, wherein the TCI information indicates one TCI state, wherein the first subset of DMRS antenna ports belongs to a first CDM group, and wherein the second subset of DMRS antenna ports belongs to one or more CDM groups other than the first CDM group.

15. The serving device according to claim 13, wherein the TCI information indicates two TCI states, wherein the first subset of DMRS antenna ports belongs to a first CDM group, and wherein the second subset of DMRS antenna ports belongs to one or more CDM groups other than the first CDM group.

16. The serving device according to claim 13, wherein the TCI information indicates one TCI state; and
   wherein the program further includes instructions to provide a radio resource control (RRC) configuration indicating the first subset of DMRS antenna ports and the second subset of DMRS antenna ports.

17. The serving device according to claim 13, wherein the TCI information indicates two TCI states; and
   wherein the program further includes instructions to provide a radio resource control (RRC) configuration indicating the first subset of DMRS antenna ports and the second subset of DMRS antenna ports.

18. The serving device according to claim 17, wherein the program further includes instructions to provide the RRC configuration in the configuration information related to a set of PTRS antenna ports.

19. The serving device according to claim 13, wherein the TCI information indicates a first TCI state and a second TCI state, wherein the first subset of DMRS antenna ports is associated with the first TCI state, and wherein the second subset of DMRS antenna ports is associated with the second TCI state.

20. The serving device according to claim 12, wherein the set of DMRS antenna ports is assigned a first codeword and a second codeword, wherein a first PTRS antenna port of the set of PTRS antenna ports is associated with a DMRS antenna port of the set of DMRS antenna ports having a specific index assigned to the first codeword, and wherein a second PTRS antenna port of the set of PTRS antenna ports is associated with a DMRS antenna port of the set of DMRS antenna ports having a specific index assigned to the second codeword.

21. The serving device according to claim 12, wherein the program further includes instructions to:
   provide the configuration information related to the set of PTRS antenna ports through higher layer signalling; and
   provide the control information in a physical downlink control channel (PDCCH) associated with a physical downlink shared channel (PDSCH).

22. The serving device according to claim 21, wherein the set of PTRS antenna ports and the set of DMRS antenna ports are scheduled for the PDSCH.

23. A method, comprising:
   obtaining configuration information related to a set of phase tracking reference signal (PTRS) antenna ports;
   obtaining control information indicating at least one of one or more codewords, a set of demodulation reference signal (DMRS) antenna ports assigned to the one or more codewords, or transmission configuration indication (TCI) information indicating one or more TCI states; and
   determining an association between the set of PTRS antenna ports and the set of DMRS antenna ports based on the configuration information related to the set of PTRS antenna ports and the control information, wherein the association between the set of PTRS antenna ports and the set of DMRS antenna ports indicates that a DMRS antenna port of the set of DMRS antenna ports associated with a PTRS antenna port is used for transmission of a PTRS, wherein in response to only one PTRS port and one codeword being scheduled, the PTRS antenna port is associated with a lowest indexed DMRS antenna port of the set of DMRS antenna ports, wherein in response to only one PTRS port and two codewords being scheduled, and further in response to modulation and coding scheme (MCS)

indices of the two codewords being different, the PTRS antenna port is associated with the lowest indexed DMRS antenna port among the set of DMRS antenna ports assigned for the codeword with a higher MCS index, and wherein in response to only one PTRS port and two codewords being scheduled, and further in response to the MCS indices of the two codewords being same, the PTRS antenna port is associated with the lowest indexed DMRS antenna port assigned for codeword 0.

24. A method, comprising:
providing configuration information related to a set of phase tracking reference signal (PTRS) antenna ports; and
providing control information indicating at least one of one or more codewords, a set of demodulation reference signal (DMRS) antenna ports assigned to the one or more codewords, or transmission configuration indication (TCI) information indicating one or more TCI states,
wherein an association between the set of PTRS antenna ports and the set of DMRS antenna ports is determined based on the configuration information related to a set of PTRS antenna ports and the control information, and wherein the association between the set of PTRS antenna ports and the set of DMRS antenna ports indicates that a DMRS antenna port of the set of DMRS antenna ports associated with a PTRS antenna port is used for transmission of a PTRS, wherein in response to only one PTRS port and one codeword being scheduled, the PTRS antenna port is associated with a lowest indexed DMRS antenna port of the set of DMRS antenna ports, wherein in response to only one PTRS port and two codewords being scheduled, and further in response to modulation and coding scheme (MCS) indices of the two codewords being different, the PTRS antenna port is associated with the lowest indexed DMRS antenna port among the set of DMRS antenna ports assigned for the codeword with a higher MCS index, and wherein in response to only one PTRS port and two codewords being scheduled, and further in response to the MCS indices of the two codewords being same, the PTRS antenna port is associated with the lowest indexed DMRS antenna port assigned for codeword 0.

25. A non-transitory computer readable medium storing program code for execution by a computer, the program code comprising instructions for:
obtaining configuration information related to a set of phase tracking reference signal (PTRS) antenna ports;
obtaining control information indicating at least one of one or more codewords, a set of demodulation reference signal (DMRS) antenna ports assigned to the one or more codewords, and transmission configuration indication (TCI) information indicating one or more TCI states; and
determining an association between the set of PTRS antenna ports and the set of DMRS antenna ports based on the configuration information related to the set of PTRS antenna ports and the control information, wherein the association between the set of PTRS antenna ports and the set of DMRS antenna ports indicates that a DMRS antenna port of the set of DMRS antenna ports associated with a PTRS antenna port is used for transmission of a PTRS, wherein in response to only one PTRS port and one codeword being scheduled, the PTRS antenna port is associated with a lowest indexed DMRS antenna port of the set of DMRS antenna ports, wherein in response to only one PTRS port and two codewords being scheduled, and further in response to modulation and coding scheme (MCS) indices of the two codewords being different, the PTRS antenna port is associated with the lowest indexed DMRS antenna port among the set of DMRS antenna ports assigned for the codeword with a higher MCS index, and wherein in response to only one PTRS port and two codewords being scheduled, and further in response to the MCS indices of the two codewords being same, the PTRS antenna port is associated with the lowest indexed DMRS antenna port assigned for codeword 0.

* * * * *